United States Patent
Chang et al.

(10) Patent No.: US 6,930,412 B2
(45) Date of Patent: Aug. 16, 2005

(54) CLOSED BOX STRUCTURE OF THE HORIZONTAL LINEAR MOTOR MACHINE TOOL

(76) Inventors: En-Sheng Chang, No. 4, Lane 7, Shensi 8 street, Taichung City (TW); Ching-Yuan Lin, No. 9, Lane 50, Cheng Ho Rd., West District, Taichung City (TW); Chin-Mou Hsu, 8F, No. 67, Henghsiao Rd., Taichung City (TW); Hsuan-Jen Kung, No. 9, Lane 120, Ho Tzuo street, Dou Liou City, Yunlin Hsien (TW)

( * ) Notice: Subject to any disclaimer, the term of this patent is extended or adjusted under 35 U.S.C. 154(b) by 0 days.

(21) Appl. No.: 10/346,769

(22) Filed: Jan. 16, 2003

(65) Prior Publication Data

US 2004/0140721 A1 Jul. 22, 2004

(51) Int. Cl.$^7$ ............................................... G05G 11/00
(52) U.S. Cl. ............................. 310/12; 355/53; 355/72; 74/490.08
(58) Field of Search ................... 74/471 XY, 479.01, 74/490.08, 490.09; 355/53, 72; 310/12

(56) References Cited

U.S. PATENT DOCUMENTS 6,652,204 B2 * 11/2003 Stengele et al. ............ 409/235
6,661,130 B2 * 12/2003 Yamazaki et al. ............ 310/12

* cited by examiner

*Primary Examiner*—Darren Schuberg
*Assistant Examiner*—Judson H. Jones
(74) *Attorney, Agent, or Firm*—Pro-Techtor International Services

(57) ABSTRACT

A closed box structure of a horizontal linear motor machine tool, comprising a frame, serving as a machine platform, carrying an X-movable part, a Y-movable part, and a Z-movable part, with said Y-movable part mounted on said X-movable part, said Z-movable part mounted on said Y-movable part, and said Z-movable part having a main axis head; characterized in that said frame, said X-movable part and said Y-movable part are shaped like open squares, said X-movable part, said Y-movable part and said Z-movable part each carry a set of two symmetrically adapted linear motors for being driven, wherein for each of said sets of linear motors magnetic forces are balanced against each other, so that deformations due to magnetic forces are avoided.

6 Claims, 3 Drawing Sheets

CLOSED BOX STRUCTURE OF THE HORIZONTAL LINEAR MOTOR MACHINE TOOL

FIELD OF THE INVENTION

The present invention relates to a closed box structure of a horizontal linear motor machine tool, particularly to a closed box structure which avoids the shortcomings of excessive weight and insufficient stiffness of conventional machine tools and which is used in a horizontal linear motor machine tool. The movable parts of the present invention are two frames, shaped like open squares, thus ensuring high stiffness and an optimal light structure. For each axis, a main gliding rail and an auxiliary gliding rail are provided, while linear motors are symmetrically adapted to each other. The gliding rails and linear motors of the present invention are optimally disposed in a driving system of a machine tool, enhancing strength and minimizing deformations. Overload of rails is decreased, corresponding to an optimum design of horizontal linear motor high-speed machine tools.

DESCRIPTION OF RELATED ART

The technology of fast cutting has flourished in recent years. Since fast cutting offers the advantages of high volumes, low deforming, appropriate roughness and low cutting force, today's development of cutting does not do without high speed cutting, which has transformed conventional machine tooling.

Conventional machine tools have frames with a servomotor and a guiding screw as a driving system. This design meets demands for strength and precision. If, however, linear motors are employed as driving systems in conventional high-speed machine tools, within systems and rows of driving units demands for high speed are not fulfilled.

Linear motors are characterized by fast movements without backlash and have come into use in all factories. In production machines of the next generation, linear motors have become the main driving source. Along with mature electronic and driving technologies, linear motors have increasingly replaced ball screws and servomotors in factories. Due to the high speed of linear motors, long processes are accommodated and the problem of backlash is avoided, answering the needs of fast machine tools. At high speed, however, machines have to be freed from load to take the load of the motor. Furthermore, sufficient stiffness is required to avoid deforming at high speed. When a linear motor moves, besides a strong driving force, multiple magnetic forces are generated between coils and permanent magnets, causing overload on machines and rails.

Conventional machine tools at least have the following shortcomings:
(1) As shown in FIG. 4, a traditional machine tool 80 has a servomotor and a screw 81 for transforming a rotating movement into a linear movement. Inertia of the machine is high, and speed is limited, so that feeding and working speed cannot be raised and acceleration cannot be increased. Furthermore, problems related to structural parts, screw, gear, working and assembly hamper precision.
(2) As shown in FIG. 5, a conventional machine tool 90, though having a driving system with linear motors, being close to the front side provided with two gliding rails 91 along the Y axis, during a forward and backward movement along the Z axis there is no supporting rail in the left and right directions and speed controlling forces are not sufficient, leading to deformations at high speed. Furthermore, three gliding rails 92 are provided along the X axis, with two of the gliding rails 92 being mounted on the lower side and one of the gliding rails 92 being mounted on the upper side. Mounting the gliding rails 92 on different levels complicates working and assembly.

SUMMARY OF THE INVENTION

Having considered the deficiencies of conventional machine tools, having maintained many years of practical experience with design and development of products, and having undergone countless practical designs and experiments, the present inventor came up with a closed box structure of a horizontal linear motor machine tool, with the closed box structure of a horizontal-linear motor machine tool seeking to implement an optimal system design and arrangement of driving units, so as to meet requirements on machine tools with linear motors at high speed.

An object of the present invention is to provide a closed box structure of a horizontal linear motor machine tool which is easily worked and assembled and has sufficient stiffness. The system has a closed frame, comprising two movable parts (e.g., along an X axis and a Y axis) formed like squares and a main axis movable part (e.g., along a Z axis), with linear motors mounted on upper and lower ends of the X movable part providing sufficient driving force for moving and with rails attached-to upper and lower sides of the frame in a single plane, facilitating working and assembly and providing sufficient support.

Another object of the present invention is to provide a closed box structure of a horizontal linear motor machine tool which is not deformed by magnetic forces and which reduces load on the rails. The system has along each axis (e.g., X, Y and Z axes) two linear motor assemblies, which provide sufficient driving force, with the linear motor assemblies on two axes (e.g., the Y and Z axes) being symmetric to balance magnetic forces on two sides.

A further object of the present invention is to provide a closed box structure of a horizontal linear motor machine tool which meets demands of high speed and has sufficient stiffness. The system has along each axis (e.g., X, Y and Z axes) a main gliding rail and an auxiliary gliding rail, which provide sufficient stiffness, so that at high speed no deformations occur.

The present invention can be, more fully understood by reference to the following description of an embodiment and accompanying drawings.

DESCRIPTION OF THE EMBODIMENT

As shown in FIGS. 1–3, the present invention comprises: a frame 1, serving as a machine platform; an X-movable part 2, movable in left and right directions; a Y-movable part 3, movable in up and down directions; and a Z-movable part 4, movable in forward and backward directions.

The frame has a lower end and an upper end, on which a linear gliding rail 11 and a linear gliding rail 12 are mounted, respectively, and is shaped like an open square, allowing the X-movable part 2 to be placed on the frame and to move thereon in the left and right directions. The gliding rail 11 on the lower end of the frame 1 serves as a main rail, and the gliding rail 12 on the upper end of the frame 1 serves as an auxiliary rail, during rapid movements preventing deformations due to different movements on the upper and lower ends. Since the gliding rails 11, 12 on the lower and upper ends of the frame 1 are oriented along a common plane, the horizontal plane, load on the rails is reduced, making working and assembly more convenient.

On a rear side of an upper end of the X-movable part 2 and on a lower end thereof linear motors 21, 22 are mounted, respectively, driving the X-movable part 2. The X-movable part 2 has an empty central part with parallel opposing inner walls, to which gliding rails 23 are attached, so that the X-movable part 2 is shaped like an open square, accommodating the Y-movable part 3 and a movement thereof up and down, providing stiffness for a cutting process. Gliding rails 24 are attached to the inner walls of the central part of the X-movable part 2, serving as auxiliary rails, so as to prevent deformations of the Y-movable part 3 if at high speed controlling forces are not sufficient.

The Y-movable part 3 has two opposing sides furnished with linear motors 31. The linear motors 31 are symmetrically adapted to each other to balance magnetic forces, thus avoiding deformations of the frame 1 due to magnetic forces.

The Z-movable part 4 has a main axis head 401 with a lower side, to which two parallel gliding rails 41 are attached, serving as main gliding rails. The Z-movable part 4 is movable forward and backward inside the Y-movable part 3. The Z-movable part 4 has two opposing sides, to which two parallel gliding rails 42 are attached, serving as auxiliary gliding rails. Thus deformations of the main axis head 401 are prevented during forward and backward movements thereof and during working. Linear motors 43 are mounted on left and right sides of the main axis head 401, driving the Z-movable part 4. The linear motors 43 are symmetric to balance magnetic forces on the main axis head 401.

As the above explanation shows, the present invention at least has the following advantages:

(1) Due to direct transmission of the linear motor driving system on the machine, without using a servomotor and a screw to convert a rotating movement into a linear movement, working speed and precision are enhanced.
(2) By using two symmetric linear motors along each axis, sufficient driving force is provided. Since the linear motor assemblies on two axes (e.g., the Y and Z axes) are symmetric, magnetic forces on two sides are balanced, avoiding deformations due to magnetic forces and reducing load on the gliding rails.
(3) To meet demands of high speed, the system has along each axis (e.g., X, Y and Z axes) a main gliding rail and an auxiliary gliding rail, which provide sufficient stiffness, so that at high speed no deformations occur.
(4) The closed box structure provides an optimal light structure for rapid movement, at the same time maintaining high stiffness.

Figure 1:
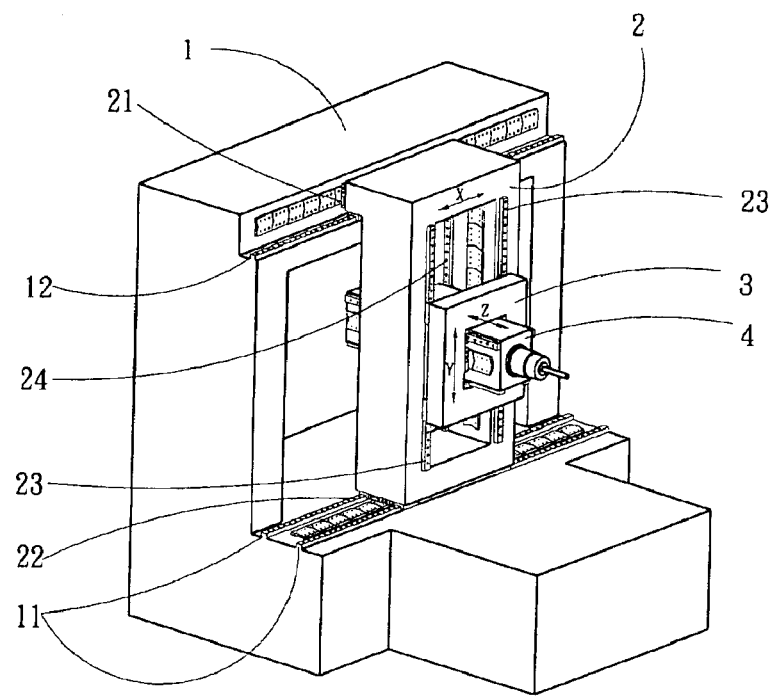
FIG. 1 is a perspective schematic illustration of the present invention from outside.
Figure 2:
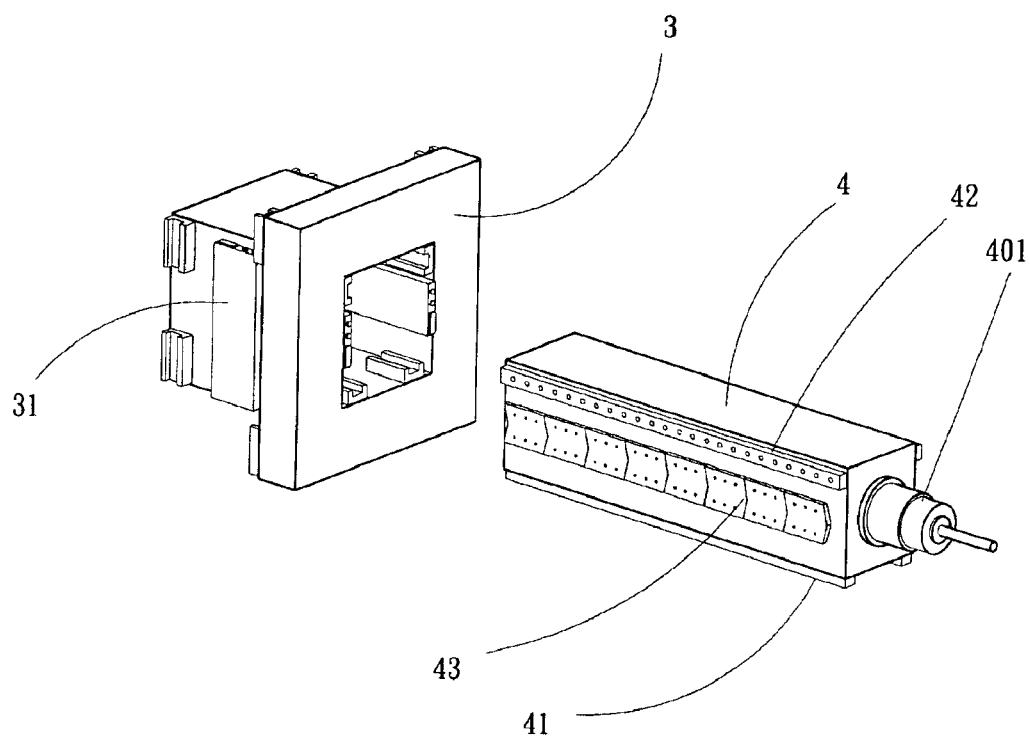
FIG. 2 is a perspective schematic illustration of the disassembled Y-movable part and Z-movable part of the present invention.
Figure 3:
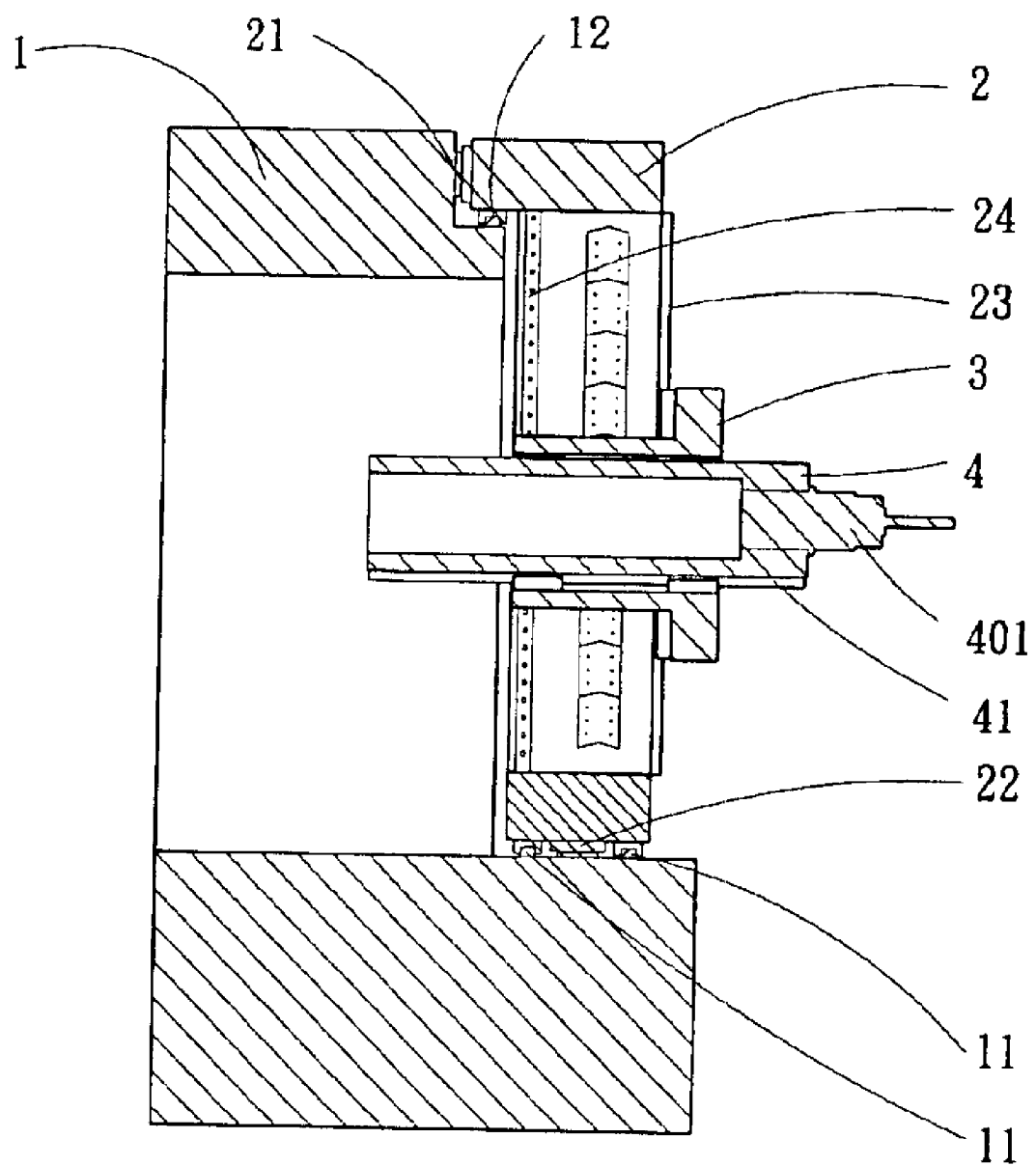
FIG. 3 is a sectional schematic illustration of the present invention.
Figure 4:
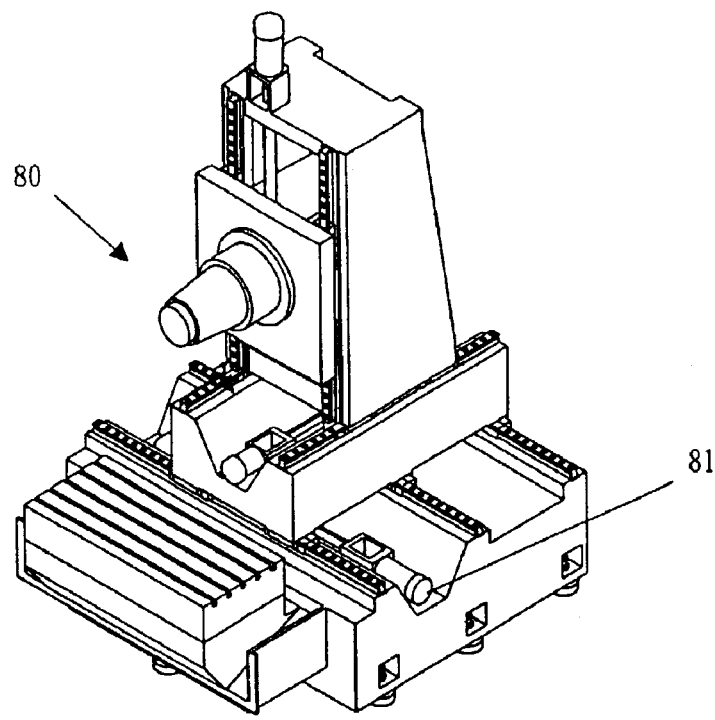
FIG. 4 is a perspective schematic illustration of the servomotor and the screw of a conventional machine tool.
Figure 5:
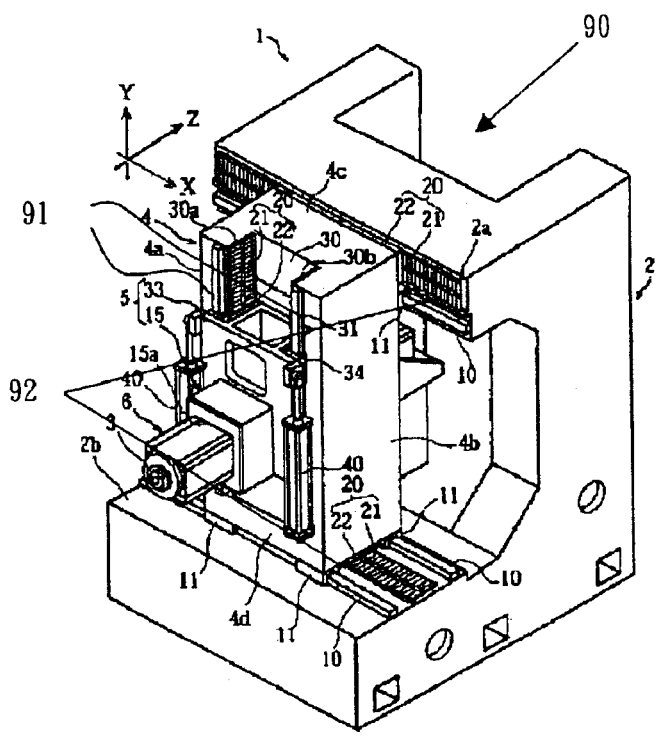
FIG. 5 is a perspective schematic illustration of another conventional machine tool having linear motors.

What is claimed is:

1. A closed box structure of a horizontal linear motor machine tool, comprising:
a frame serving as a machine platform, said frame including an X-movable parts a Y-movable part, and a Z-movable part, with said Y-movable part mounted on said X-movable part, said Z-movable part mounted on said Y-movable part, and said Z-movable part having a main axis head; wherein
said frame, said X-movable part, and said Y-movable part are shaped like open squares, said X-movable part, said Y-movable part, and said Z-movable part are each associated with a set of two linear motors, such that for each of said sets of linear motors, magnetic forces are balanced against each other so that deformation due to magnetic forces is avoided,
each axis of said frame includes a main gliding rail and an auxiliary gliding rail, and
said X-movable part has an open central part with parallel opposing inner walls to which parallel gliding rails are attached, allowing said Y-movable part to glide thereon.

2. The closed box structure of a horizontal linear motor machine tool according to claim 1, wherein gliding rails are mounted on a lower end and on an upper end of said frame.

3. The closed box structure of a horizontal linear motor machine tool according to claim 1, wherein said main axis head of said Z-movable part on a lower side has parallel gilding rails serving as main rails, allowing said Z-movable part to glide inside said Y-movable part, and said Z-movable part on two opposing sides has parallel gliding rails serving as auxiliary rails.

4. A closed box structure of a horizontal linear motor machine tool, comprising:
a frame serving as a machine platform, said frame including an X-movable part, a Y-movable part, and a Z-movable part, with said Y-movable part mounted on said X-movable part, said Z-movable part mounted on said Y-movable part, and said Z-movable part having a main axis head; wherein
said frame, said X-movable part, and said Y-movable part are shaped like open squares, said X-movable part, said Y-movable part, and said Z-movable part are each associated with a set of two linear motors, such that for each of said sets of linear motors, magnetic forces are balanced against each other so that deformation due to magnetic forces is avoided,
each axis of said frame includes a main gliding rail and an auxiliary gliding rail, and
said main axis head of said Z-movable part on a lower side has parallel gliding rails serving as main rails, allowing said Z-movable part to glide inside said Y-movable part, and said Z-movable part on two opposing sides has parallel gliding rails serving as auxiliary rails, so as to prevent deformations while said main axis head moves forward and backward and during working.

5. The closed box structure of a horizontal linear motor machine tool according to claim 4, wherein gliding rails are mounted on a lower end and on an upper end of said frame, allowing said X-movable part to glide thereon.

6. The closed box structure of a horizontal linear motor machine tool according to claim 4, wherein said X-movable part has an open central part with parallel opposing inner walls to which parallel gliding rails are attached, allowing said Y-movable part to glide thereon.

* * * * *